United States Patent [19]

Seiger

[11] Patent Number: 4,913,782

[45] Date of Patent: Apr. 3, 1990

[54] MICROPOROUS ELEMENTAL SILVER ARTICLE AND METHOD

[75] Inventor: Harvey N. Seiger, Mayfield Heights, Ohio

[73] Assignee: Gould Inc., Rolling Meadows, Ill.

[21] Appl. No.: 98,380

[22] Filed: Sep. 18, 1987

[51] Int. Cl.$^4$ .................. H01M 4/04; H01M 4/54
[52] U.S. Cl. .................. 204/2.1; 204/109; 429/219
[58] Field of Search ............ 204/2.1, 96, 109; 429/219

[56] References Cited

U.S. PATENT DOCUMENTS

| | | | |
|---|---|---|---|
| 3,671,321 | 6/1972 | Herman et al. | 136/75 |
| 4,003,757 | 1/1977 | Lux et al. | 429/219 |
| 4,009,056 | 2/1977 | Megahed et al. | 429/126 |
| 4,120,757 | 10/1978 | Seiger et al. | 204/2.1 |
| 4,269,907 | 5/1981 | Momyer et al. | 429/67 |
| 4,308,467 | 7/1977 | Lippold et al. | 429/219 |
| 4,481,266 | 11/1984 | Littauer et al. | 429/12 |
| 4,681,663 | 7/1987 | Seiger | 204/21 |

OTHER PUBLICATIONS

Seiger, et al., "Nickel Oxide Electrode Development," in *Proceedings—27th Power Sources Symposium*, Jun. 21-24, 1976, at 115-120.

Primary Examiner—John F. Niebling
Assistant Examiner—William T. Leader
Attorney, Agent, or Firm—Marshall, O'Toole, Gerstein, Murray & Bicknell

[57] ABSTRACT

An article and a method of forming an article comprising microporous elemental silver is disclosed wherein a porous conductive substrate is filled with a homogeneous mixture of $Ag_2O$ and microporous elemental silver produced by the electrochemical reduction of $Ag_2O$. The preparation of articles therefrom is also disclosed.

14 Claims, 7 Drawing Sheets

MICROPOROUS ELEMENTAL SILVER ARTICLE AND METHOD

BACKGROUND OF THE INVENTION

1. Field of the Invention

This invention relates generally to novel forms of elemental silver and, more particularly, this invention relates to articles including microporous elemental silver, methods of preparing the same and methods of preparing articles therefrom.

2. Description of Related Art

Electrochemical cells utilizing bipolar electrode designs having reactive metal electrodes supported on substrate current collectors are well-known. See, for example, Momyer et al, U.S. Pat. No. 4,269,907 (May 26, 1981), the disclosure of which is hereby incorporated by reference, wherein cells including an aqueous electrolyte, an anode of an alkali metal, such as lithium, for example, a cathode spaced from the anode, and an intercell electrical connector are disclosed. The intercell electrical connector typically comprises a substrate of a conductive metal (which may be in the form of foil or a plate) such as nickel or silver-plated nickel. The anode is formed on one surface of the substrate with the cathode of an adjacent cell on the opposite surface of the substrate. In such cells, the cathode may comprise an electrochemically active material, such as silver oxide, and the electrolyte may comprise an aqueous alkaline solution.

Momyer et al also disclose an electrochemical cell stack comprising a plurality of bipolar electrodes connected in series.

Silver oxide electrodes are generally useful in silver oxide/lithium electrochemical cells as well as in other electrochemical power generating systems, such as silver oxide/aluminum, silver oxide/zinc, silver oxide/iron and silver oxide/cadmium cells. In the past, the silver electrodes used by the silver battery industry have generally been fabricated either from metallurgically produced silver powder or from chemically produced silver oxide powder.

For example, in forming a silver oxide/lithium bipolar electrode according to the conventional process commonly known as parallel oxidation, silver powder is first extruded onto a transfer paper from a rolling mill. This "biscuit" of silver is then sintered and hot forged onto a conductive metal foil substrate. The metal foil is generally made thin both for design considerations, e.g., weight and volume minimization, and economic considerations, i.e., cost minimization. For example, silver clad nickel foil substrates having a thickness of only about 1 mil are commonly used in the assemblage of silver oxide/lithium bipolar electrodes. The hot forgings of silver on metal substrates are then assembled in a stack in which the forgings of silver and nickel counter electrodes are alternated and separated by a non-conductive separator material to reduce the likelihood of short circuits developing between the substrates and the forgings of silver during the charging process.

All of the silver forgings in the charging stack are electrically connected in parallel for attachment to the positive terminal of a DC power supply. All of the nickel counter electrodes are, in turn, electrically connected in parallel for attachment to the negative terminal of the aforementioned DC power supply. The charging stack is then placed in an aqueous electrolyte, such as a metal hydroxide solution. Ionic current flow is generated through the aqueous electrolyte and the silver is thereby oxidized. The electrochemical process occurring at the nickel counter electrodes is cathodization which results in the release of hydrogen gas, as follows:

$$4H_2O + 4e^- \rightarrow 2H_2 + 4OH^- \tag{1}$$

The silver is electrochemically oxidized first to the monovalent state (see equation 2, below) and may then be oxidized to the divalent level or the peroxide state (see equation 3, below):

$$2Ag + 2OH^- \rightarrow Ag_2O + H_2O + 2e^- \tag{2}$$

$$Ag_2O + 2OH^- \rightarrow 2AgO + H_2O + 2e^- \tag{3}$$

The theoretical electromotive force (EMF) for the oxidation of Ag to the monovalent level is +0.342 volt. The standard redox potential of oxygen is +0.401 volt and, consequently, oxygen gas does not evolve at the voltage level associated with the oxidation of Ag to the monovalent state. The second stage of oxidation of the active silver material, however, occurs at an electric potential of about +0.599 volt which is nearly 0.2 volt greater than the oxygen evolution voltage. Consequently, the oxidation process at this upper voltage level is inefficient as oxygen gas is evolved thereby.

Batteries having both high capacities and high discharge rates are required in many applications. Further, because of design considerations, many applications require batteries wherein the electrode configuration is essentially flat. Flatness is a particularly important consideration in bipolar electrode configurations wherein both the anode and cathode active materials are bonded on opposite sides of a conductive metal substrate.

The above-described method of electrode formation, however, frequently results in bent electrodes. For example, silver oxide electrodes prepared by the parallel oxidation method of formation are frequently of a bent, irregular shape. The bending of the electrodes is believed to be largely a result of the stoichiometric and molar volume changes which occur upon oxidation during electrode formation and is commonly referred to as "potato chipping".

SUMMARY OF THE INVENTION

It is an object of the invention to overcome one or more of the problems described above.

According to the invention, a method of forming an article comprising microporous elemental silver including the step of filling a porous conductive substrate with a homogeneous mixture of $Ag_2O$ and microporous elemental silver produced by the electrochemical reduction of $Ag_2O$ is disclosed. The degree of filling of the substrate is sufficient to reinforce the substrate.

In addition, the invention comprehends articles formed by this process, as well as the preparation of articles therefrom.

Other objects and advantages will be apparent to those skilled in the art from the following detailed description taken in conjunction with the figures and the appended claims.

DETAILED DESCRIPTION OF THE INVENTION

According to the invention, the preparation of elemental silver via electrochemical impregnation of a porous conductive substrate with silver nitrate to form $Ag_2O$ which in turn is reduced, introduces microporosity into the silver crystals. This microporosity assists in stabilizing the dimensions of the silver active material so that articles made therefrom will have geometric measurements such as length, width and thickness which remain virtually constant regardless of the oxidation state of the active material.

According to the invention, a porous conductive substrate such as reticulated vitreous carbon (RVC) manufactured by Fluorocarbon Co. of Anaheim, Calif. is filled, at least in part, with a homogenous mixture of $Ag_2O$ and microporous elemental silver produced by the electrochemical reduction of $Ag_2O$. It is also to be understood, however, that other porous conductive substrate materials such as foamed silver, lead and tin may be used in the practice of the invention.

Alternatively, a porous conductive substrate formed by heating a homogeneous mixture of silver oxalate and elemental silver in a reducing atmosphere to reduce at least a portion of the silver oxalate to elemental silver may, because of the presence of silver therein, be a preferred substrate material for use in some applications.

A porous conductive substrate made from elemental silver powder and silver oxalate (to control the porosity) may be formed by either a dry or a slurry process. Using a dry process, a homogeneous mixture of elemental silver powder and silver oxalate is formed into a precursor body which is heated in a reducing atmosphere to reduce a portion of the silver oxalate to elemental silver to form the porous substrate.

The preparation of a porous conductive substrate, such as by heating a mixture of silver oxalate and elemental silver in a reducing atmosphere, can be done by one skilled in the art, guided by the teachings contained herein. For example, a precursor body made of a homogeneous mixture of elemental silver powder and silver oxalate may be passed through and heated in reducing atmosphere, e.g. cracked ammonia, hydrogen, or water gas, contained in a belt furnace.

The reducing atmosphere is maintained in the central portion of the furnace such as by means of inert gas, e.g., nitrogen gas, curtains. The inert gas curtains act to prevent atmospheric oxygen from entering into the furnace and reacting therein.

It is to be understood that in this way, the mixture of silver oxalate and elemental silver is heated to a temperature of about 850° C., preferably up to about the sintering temperature of silver, e.g., about 500° C., and reduced to form a porous conductive substrate, such as a material having a porosity of about 90% or more. Control of the size of the voids in the material is effected by the heat conditions and the ratio of the oxalate compound to silver in the mixture.

A body having a high porosity is obtained because silver oxalate ($Ag_2C_2O_4$) has a molar volume of about 60 $cm^3$ whereas elemental silver has a molar volume of only about 10 $cm^3$. Thus, reduction of $Ag_2C_2O_4$ results in a structure having a void volume of about 40 $cm^3$ per mole, which void volume is in addition to the natural void volume inherent in any powder.

Such highly porous structures are generally very compliant. Thus, in order to produce a structure which will remain flat during stress producing and/or generating operations, such as experienced in the oxidation of precursor electrodes, for example, such porous structures must be reinforced.

Figure 1:
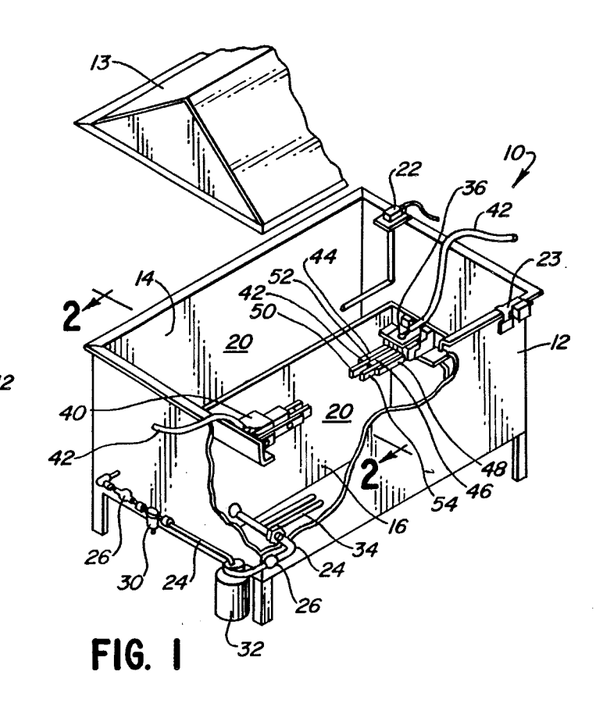
FIG. 1 is a simplified schematic fragmentary perspective representation of an impregnation assembly for the electrochemical filling of a porous conductive substrate according to a typical embodiment of the invention.
Figure 2:
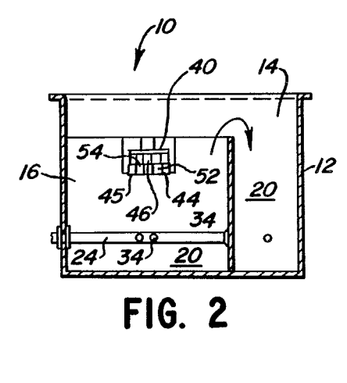
FIG. 2 is a cross-section elevation of the assembly of FIG. 1, taken along line 2—2 of FIG. 1.
Figure 3:
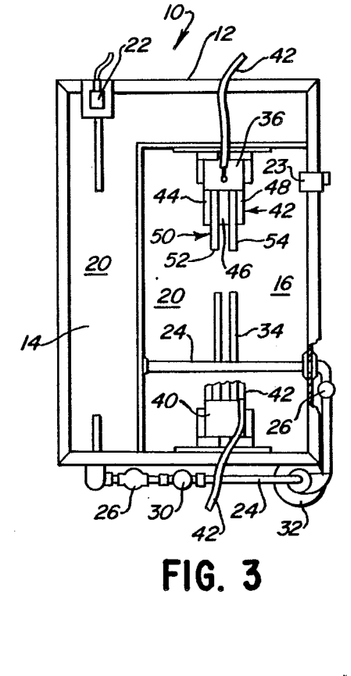
FIG. 3 is an overhead view of the assembly of FIG. 1 taken with the lid removed.

Referring to FIGS. 1–3, an impregnation assembly, generally designated 10, for the filling and reinforcement of a porous conductive substrate such as that formed as described above, with a uniform mixture of $Ag_2O$ and electrochemically produced microporous elemental silver derived from an electrochemical reduction of $Ag_2O$ is shown. The assembly 10 includes a container 12 with an associated container lid 13. The container 12 includes respective supply and processing compartments 14 and 16 which hold a relatively dilute aqueous solution 20 of acidified silver nitrate ($AgNO_3$). For example, a 3 molar aqueous solution of silver nitrate has proven effective in the practice of the invention.

While in compartment 14, the solution 20 is heated by means of an immersion heater 22 in conjunction with an associated heater control unit 23. The solution 20 from the supply compartment 14 is then flowed via piping 24, associated valves 26, a filter 30, a circulating pump 32 and a manifold 34 to the processing compartment 16.

The processing compartment 16 includes rack supports 36 and 40 which are connected by wiring 42 to the negative and positive lead terminals, respectively, of a power supply (not shown).

The rack supports 36 and 40 hold a 3 bar counter electrode rack 42 with the bars of the rack 42 individually designated 44, 46 and 48, respectively. The rack supports 36 and 40 also hold a two bar substrate rack 50, with the bars of the rack 50 individually designated 52 and 54, respectively. The bars 52 and 54 of rack 50 are sandwiched between the bars 44, 46 and 48 of rack 42.

Thus, the bar 52 of rack 50 is nestled between the bars 44 and 46 of rack 42 and the bar 54 of rack 50 is nestled between the bars 46 and 48 of rack 42.

In order to facilitate comprehension, FIG. 1 has been shown without including a showing of the substrates and inert anode counter electrodes. It is to be understood, however, that such substrates and counter electrodes are hung from the racks 50 and 42, respectively, such as by means of stainless steel pins and placque clips such as 56, with each substrate sandwiched between two opposing counter electrodes.

Within the pores of the substrate, nitrate ion is electrochemically reduced via the electric current, as follows:

$$NO_3^- + 3H_2O + 3H^+ + 8e^- + \text{current} \rightarrow NH_3 + 6OH^- \qquad (4)$$

Nitrate ion reduction is preferably but not necessarily carried out at a current density of at least about 0.5 A/in$^2$.

As the ammonia concentration of the solution increases, the pH of the solution changes. When the solution becomes sufficiently alkaline, silver hydroxide (AgOH) precipitates in the pores. The silver hydroxide instantaneously changes to form $Ag_2O$ and water, with the water going into the solution.

A portion of the current acts to reduce $Ag_2O$ to microporous elemental silver, as follows:

$$Ag_2O + H_2O + 2e^- + \text{current} \rightarrow Ag(\text{microporous}) + 2OH^- \qquad (5)$$

The remainder of the current continues to reduce silver nitrate to ammonia which is instrumental in further increasing the pH of the solution within the pores of the substrate..

When the solution within the pores is sufficiently alkaline, $Ag_2O$ is precipitated. While silver ion, i.e., $Ag+$, is present and reaction (4) occurs, essentially a quantitative conversion of $Ag+$ to $Ag_2O$ takes place. Because the medium is now alkaline, a substantially homogeneous mixture of silver oxide and elemental silver is deposited and a portion of the $Ag_2O$ is reduced to elemental Ag.

The current and time of cathodization can be controlled so as to result in optimum filling of the porous substrate. Such articles comprising microporous elemental silver can then be used in the formation of articles such as silver oxide electrodes, for example.

Figure 4:
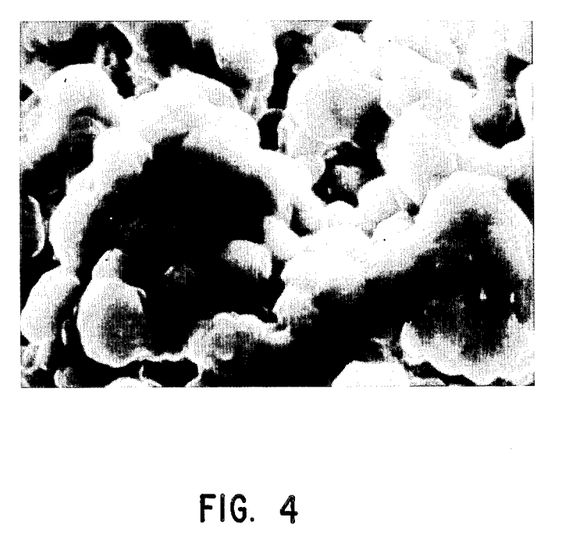
FIG. 4 is a photomicrograph (3000 magnification) of non-microporous elemental silver prepared using a prior art method.
Figure 5:
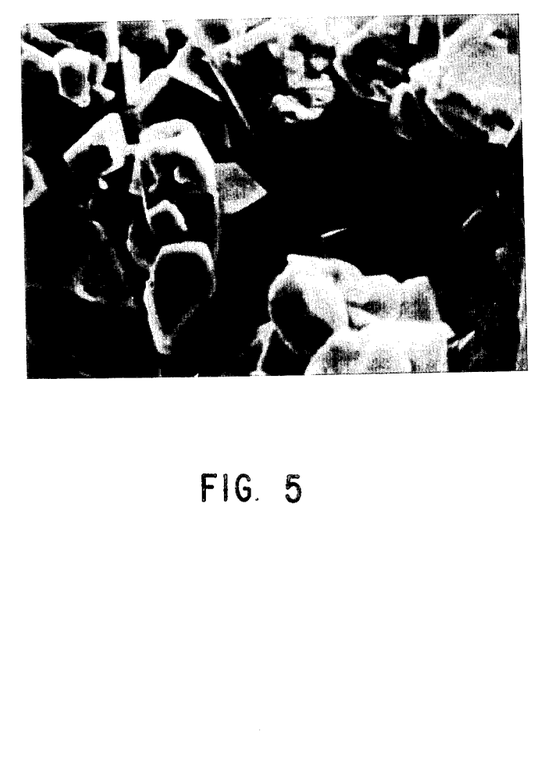
FIG. 5 is a photomicrograph (2900 magnification) of AgO crystals prepared by charging (anodizing) non-porous elemental silver.
Figure 6:
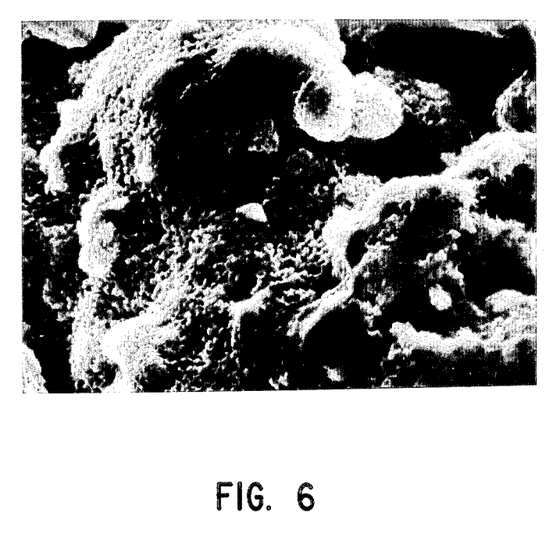
FIG. 6 is a photomicrograph (3000 magnification) of electrochemically prepared microporous elemental silver.
Figure 7:
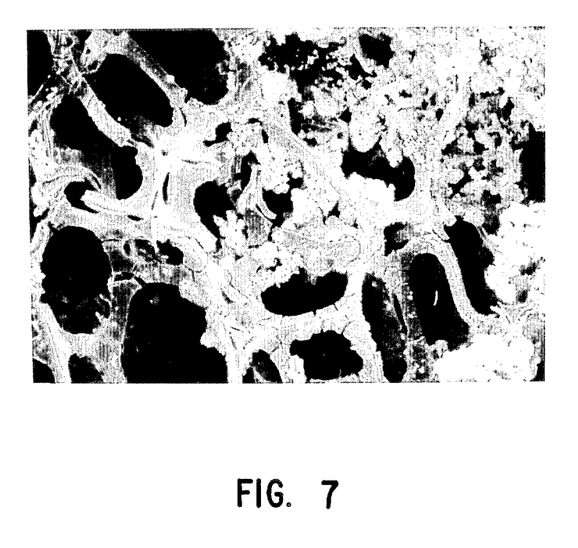
FIG. 7 is a photomicrograph (100 magnification) of $Ag_2O$ crystals formed by electrochemical cathodization of $AgNO_3$.
Figure 8:
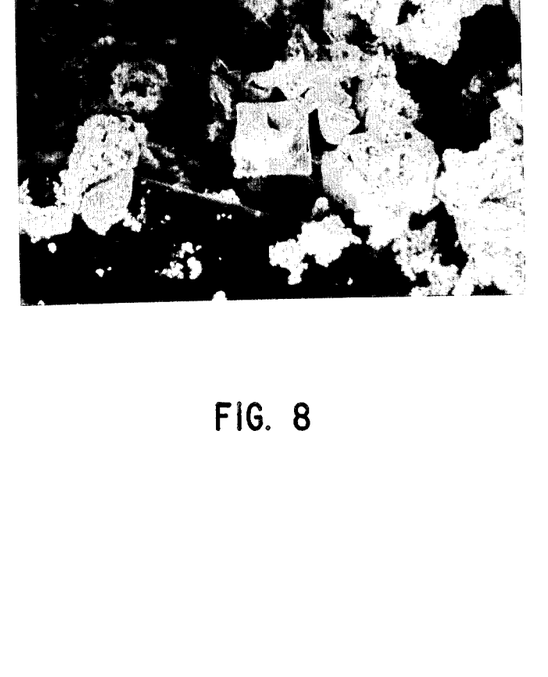
FIG. 8 is a photomicrograph (1000 magnification) of the $Ag_2O$ crystals shown in FIG. 7.

Silver material, in various forms, has been observed microscopically using a scanning electron microscope (SEM). FIG. 4 is a magnified view of nonmicroporous elemental silver prepared using a prior art method. FIG. 5 is a magnified view of AgO crystals prepared by oxidizing non-porous elemental silver showing the enlargement of the silver grain to crystals generally having ten (10) sides. The subsequent reduction of AgO to Ag introduces a microporosity within the elemental silver crystals as shown in FIG. 6 which illustrates microporous elemental silver as prepared by a process of reducing an oxidized form of silver. (See the copending, commonly assigned application Ser. No. 098,382 filed Sept. 18, 1987 of Harvey N. Seiger, entitled "Microporous Elemental Silver and Method", the disclosure of which is incorporated herein by reference.) FIG. 7 is a photomicrograph of $Ag_2O$ crystals and microporous silver formed by impregnation with $AgNO_3$ and electrochemical cathodization, with a portion of the $Ag_2O$ being directly reduced to microporous silver. FIG. 8 is similar to FIG. 7, but at a magnification ten times greater than that shown in FIG. 7.

Subsequent oxidation of precursor electrodes prepared from such electrochemically prepared silver usually will not generate the types of stress conditions in the precursor electrode as are commonly associated with precursor electrodes prepared from non-microporous silver and which result in bent, irregularly shaped silver oxide electrodes.

Figure 9:
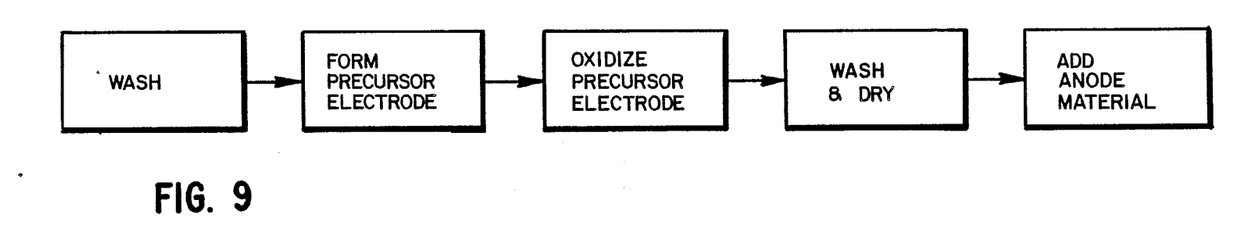
FIG. 9 is a simplified flow diagram of a process for the formation of a silver oxide/reactive metal bipolar electrode according to a typical embodiment of the invention.

Referring to FIG. 9, a simplified flow diagram of a process for the formation of a silver oxide/reactive metal bipolar electrode according to the invention is shown. An article comprising microporous elemental silver, such as that prepared using the system of FIG. 1, is washed with water or other suitable liquid to remove remaining traces of the aqueous hydroxide electrolyte. (Such hydroxides can react with carbon dioxide, as are present in the air, to form basic carbonates which can clog pores of the microporous elemental silver.)

Thereafter, using a process analogous to the above-described process of parallel oxidation, a bipolar electrode is made wherein an article comprising microporous elemental silver, e.g., the filled substrate, is utilized as a precursor electrode material. In such a process, the filled substrate is placed on a transfer paper from a rolling mill. This "biscuit" containing microporous elemental silver is then sintered and hot forged onto a conductive metal foil substrate, such as a silver clad nickel foil as is known to those skilled in the art. It is to be understood that the "biscuit", in addition to microporous elemental silver, contains the relatively inert material of which the porous conductive substrate was made, e.g. foamed silver, lead, or tin, etc., and in which the microporous elemental silver is formed according to the invention. Generally, the relatively inert material of the porous substrate remains intermixed with the microporous elemental silver throughout subsequent processing.

Subsequently, the hot forgings of microporous elemental silver on metal foil substrates are assembled in a stack in which the forgings of microporous silver and nickel counter electrodes are alternated. The silver forgings and the nickel counter electrodes are separated by a non-conductive separator material to reduce the likelihood of the development of short circuits during oxidation of the elemental silver.

The elemental silver forgings are then oxidized, such as through techniques known in the art, to form silver oxide with the precursor electrode of the sintered and hot forged microporous elemental silver being oxidized to sequentially form $Ag_2O$ and AgO. Upon such oxidation, the microporous elemental silver forms AgO crystals, with enlargement of the silver grain to crystals occurring largely in the void volume as provided by the micropores of the silver material and only in relatively minor proportion in the macropores of the precursor material. Thus, electrochemically prepared silver will not experience significant changes in particle size upon subsequent oxidation to the oxide form and a precursor electrode prepared from electrochemically prepared elemental silver will have virtually constant dimensions, regardless of the oxidation state thereof.

Figure 10:
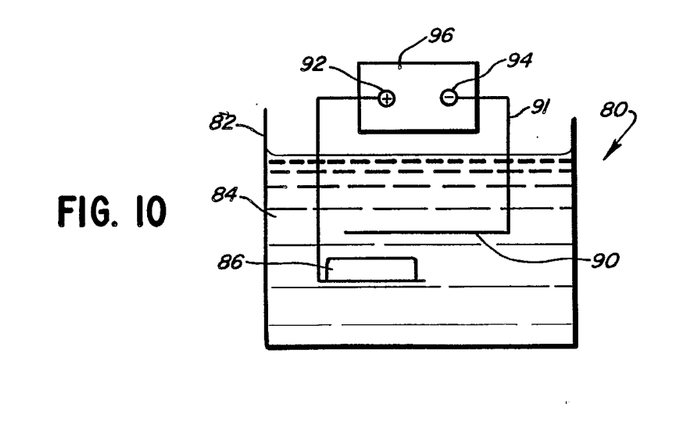
FIG. 10 is a simplified schematic representation of a system for the electrochemical anodization of a precursor electrode comprising microporous elemental silver according to a typical embodiment of the invention.

For example, referring to FIG. 10, a system, generally designated 80, for the anodization (i.e., oxidation) of such a precursor electrode is shown. The system 80 includes a container 82 holding a quantity of an aqueous alkaline electrolyte 84. A filled porous body precursor electrode 86 and a conductive sheet of metallic elemental silver 90 are disposed, either horizontally or vertically, in the aqueous alkaline electrolyte 84 and are electrically connected by wiring 91 to the positive and negative terminals 92 and 94, respectively, of a power supply 96. The aqueous alkaline medium 84 covers the porous body 86 and electric current produced by the power supply 96 is passed through the wiring 91 and subsequently through the porous body 86, the silver sheet 90 and the electrolyte 84. The porous body 86 (which is connected to the positive terminal 92 of the power supply 96) is anodized while the silver sheet 90 is cathodized with hydrogen gas being released therefrom, such as by equation (1), above. As a result, silver in the filled porous body 86 is oxidized to a divalent state to form AgO, such as by equations (2) and (3), above. Subsequent to washing and drying, these silver oxide electrodes can be fabricated into electrochemical cells.

The above-described process avoids misshaping or buckling of the electrodes while optimizing the pore and active material contents in the electrodes so as to achieve high states of charge in geometrically stable electrode structures, regardless of the oxidation level of the active material thereof.

EXAMPLES

The following examples are provided to clearly illustrate the practice of certain embodiments of the invention, but are not to be construed to limit the scope of the invention.

EXAMPLE 1

A porous substrate of reticulated vitreous carbon (RVC) was placed in acidified aqueous solution of silver nitrate at a concentration of about 2.72 M and having a pH of about 4. A dimensionally stable (DSA, dimensionally stabilized anode) counter electrode of ruthenium oxide over titanium over copper was used. The temperature of the acidified silver nitrate solution was, at the start of the run, 66° C.

Cathodization of the silver nitrate solution began at a current of about eight amperes. The current was then reduced to about one ampere during the deposition. At the end of the run, there was a voltage rise of at least 20 millivolts associated with the virtually complete electrochemical reduction of all the $Ag_2O$ to microporous elemental silver. Thus, by the end of the run, substantially all of the $Ag_2O$ had been reduced to elemental silver. The run lasted approximately 51 minutes.

EXAMPLE 2

A porous body of reticulated vitreous carbon (RVC) from Fluorocarbon Corporation (Anaheim, CA) measuring $2'' \times 2'' \times 100$ mils and having a porosity of 97% was electroplated with elemental silver. The plated substrate was mounted vertically in a tank surrounded on opposite sides by counter electrodes. The counter electrodes were Eltech Corporation's Dimensionally Stabilized Anodes (DSA) and each counter electrode was spaced 1 inch from the substrate.

The tank was filled with 3 M aqueous $AgNO_3$ solution (pH 6) to cover the substrate and the counter electrodes. A current of 1 A (250 mA/in$^2$) was applied for 1 hour. The voltage was initially 1.2 V and gradually increased to about 2 V while the current was maintained at 1 A.

The resulting deposit within the substrate was examined using scanning electron microscoping. The photomicrograph demonstrated that $Ag_2O$ was precipitated by the alkalization resulting from $NO^-_e$ reduction to $NH_3$;

and that the reduction conditions also result in the reduction of $Ag_2O$ to Ag which is microporous in nature.

The foregoing detailed description is given for clearness of understanding only, and no unnecessary limitations are to be understood therefrom, as modifications within the scope of the invention will be obvious to those skilled in the art.

What is claimed:

1. A method of forming an article comprising microporous elemental silver, said method comprising the step of:
   filling a porous conductive substrate with a mixture of $Ag_2O$ and microporous elemental silver, said mixture being produced by electrochemical reduction of $Ag_2O$ within the pores of said substrate, the degree of said filling being sufficient to reinforce said substrate, said filling step being carried out by the method comprising the steps of:
   (a) impregnating said porous conductive substrate with an acidified solution of silver nitrate;
   (b) electrochemically reducing said silver nitrate within the pores of said impregnated substrate to a degree sufficient to result in hydroxide ion formation whereby said silver nitrate solution is rendered sufficiently alkaline that $Ag_2O$ is formed in said pores; and
   (c) electrochemically reducing said $Ag_2O$ to form microporous elemental silver in said pores.

2. The method of claim 1 wherein said substrate comprises a material selected from the group consisting of foamed silver, foamed lead, foamed tin and reticulated vitreous carbon.

3. The method of claim 1 wherein said substrate is formed by a method comprising the step of:
   heating a precursor body formed of a mixture of silver oxalate and elemental silver in a reducing atmosphere to reduce at least a portion of said silver oxalate to elemental silver to form said substrate, the proportion of said silver oxalate relative to said elemental silver and the degree of said reduction being selected to result in a predetermined porosity.

4. The method of claim 3 wherein said substrate has a porosity of at least about 90%.

5. The method of claim 5 wherein said reduction of silver oxalate is carried out at a temperature of up to about 850° C.

6. The method of claim 1 wherein said acidified silver nitrate solution comprises about 1 to 3 molar aqueous silver nitrate.

7. The method of claim 1 wherein said electrochemical reduction of nitrate is conducted with a current density of at least about 0.5 ampere per square inch.

8. A method of preparing an electrode comprising AgO, said method comprising the steps of:
   (a) filling a porous conductive substrate with a mixture of $Ag_2O$ and microporous elemental silver, said mixture being produced by electrochemical reduction of $Ag_2O$ within the pores of said substrate, the degree of said filling being sufficient to reinforce said substrate;
(b) forming an integral body from said filled substrate; and
(c) oxidizing said microporous elemental silver of said integral body to form AgO, wherein said filling step (a) is carried out by impregnating said porous conductive substrate with an acidified solution of silver nitrate;

electrochemically reducing nitrate ion within the pores of said impregnated substrate to a degree sufficient to result in hydroxide ion formation whereby said silver nitrate solution is rendered sufficiently alkaline that $Ag_2O$ is formed in said pores; and electrochemically reducing said $Ag_2O$ to form microporous elemental silver in said pores.

9. The method of claim 8 wherein said substrate comprises a method selected from the group consisting of foamed silver, foamed lead, foamed tin and reticulated vitreous carbon.

10. The method of claim 8 wherein said substrate is formed by a method comprising the step of:

heating a precursor body formed of a mixture of silver oxalate and elemental silver in a reducing atmosphere to reduce at least a portion of said silver oxalate to elemental silver to form said substrate, the proportion of said silver oxalate and the degree of said reduction being selected to result in a predetermined porosity.

11. The method of claim 10 wherein said substrate has a porosity of at least about 90%.

12. The method of claim 10 wherein said reduction is of silver oxalate carried out at a temperature of up to about 850° C.

13. The method of claim 8 wherein said acidified silver nitrate solution comprises about 1 to 3 molar aqueous silver nitrate.

14. The method of claim 8 wherein said electrochemical reduction of nitrate is conducted with a current density of at least about 0.5 ampere per square inch.

* * * * *

UNITED STATES PATENT AND TRADEMARK OFFICE
CERTIFICATE OF CORRECTION

PATENT NO. : 4,913,782
DATED : April 3, 1990
INVENTOR(S) : Seiger

It is certified that error appears in the above-identified patent and that said Letters Patent is hereby corrected as shown below:

On the face of the patent, under the heading "Assignee:", "Gould Inc., Rolling Meadows, Ill." should be --Westinghouse Electric Corp., Pittsburgh, Pa.--.

Signed and Sealed this

Seventh Day of January, 1992

Attest:

HARRY F. MANBECK, JR.

*Attesting Officer*     *Commissioner of Patents and Trademarks*